(12) United States Patent
Remon

(10) Patent No.: US 6,254,770 B1
(45) Date of Patent: Jul. 3, 2001

(54) SEWER BASKET AND ITS SUPPORT

(76) Inventor: Gilles Remon, 196 Léger, Châteauguay (CA)

( * ) Notice: Subject to any disclaimer, the term of this patent is extended or adjusted under 35 U.S.C. 154(b) by 0 days.

(21) Appl. No.: 09/482,947

(22) Filed: Jan. 14, 2000

(51) Int. Cl.$^7$ .............................. B01D 29/05; B01D 35/02
(52) U.S. Cl. .................... 210/163; 210/164; 210/238; 210/451; 210/470; 210/480; 404/4
(58) Field of Search ........................ 210/163, 164, 210/232, 238, 447, 451, 470, 471, 474, 479, 480; 404/4, 5

(56) References Cited

U.S. PATENT DOCUMENTS

| | | | |
|---|---|---|---|
| 122,209 | 12/1871 | Ashman et al. . | |
| 530,816 | * 12/1894 | Wright | 210/164 |
| 815,874 | * 3/1906 | Stransky | 210/480 |
| 1,003,398 | * 9/1911 | Britzius | 210/479 |
| 1,548,509 | * 8/1925 | Campbell | 210/480 |
| 2,615,526 | 10/1952 | Lane . | |
| 3,674,149 | * 7/1972 | Donalson | 210/163 |
| 4,097,171 | * 6/1978 | Fier | 210/163 |
| 4,152,801 | * 5/1979 | Lieber | 210/470 |
| 4,198,717 | 4/1980 | Kessel . | |
| 4,419,232 | 12/1983 | Arntyr et al. . | |
| 5,072,538 | * 12/1991 | Hendricks et al. | 210/470 |
| 5,232,587 | 8/1993 | Hegemier et al. . | |
| 5,252,211 | * 10/1993 | Searfoss, Jr. | 210/474 |
| 5,372,714 | 12/1994 | Logue, Jr. . | |
| 5,405,539 | * 4/1995 | Schneider | 210/163 |
| 5,643,445 | 7/1997 | Billias et al. . | |
| 5,733,445 | 3/1998 | Fanelli . | |
| 5,772,713 | * 6/1998 | Salinas et al. | 210/480 |
| 5,888,392 | * 3/1999 | Frizell | 210/474 |
| 5,904,842 | 5/1999 | Billias et al. . | |

* cited by examiner

Primary Examiner—Christopher Upton

(57) ABSTRACT

The sewer basket is to be positioned at any selected level within a vertical sewer pipe having an interior surface and an opening at street level without in any way modifying the same. A basket support is provided comprising an expandable support for extending entirely around the interior surface of the sewer pipe and having at least one pair of opposite spaced free ends that define inturned ears through which a bolt extends and the ears are spread apart by nuts screwed on the bolt. For a sewer pipe of circular cross-section, the basket frame and the support frame are both of circular shape, the expandable frame having a single pair of spaced ears with a single bolt extending through the ears. For sewer pipes of quadrilateral shape, both the basket and the support frame are similarly quadrilateral, the support frame being made of two U-shaped sections each having opposite free ends defined by inturned ears and a bolt with nuts extending through each pair of ears. In another embodiment, the support frame is a telescopic tube with sewer engaging pads at both ends and with a pair of bolt and nuts tube expanding devices on each side of the tube.

19 Claims, 5 Drawing Sheets

SEWER BASKET AND ITS SUPPORT

FIELD OF THE INVENTION

The present invention relates to sewer baskets that are removably mounted within a vertical sewer opening at street level, commonly known as storm sewers.

BACKGROUND OF THE INVENTION

These sewer baskets are used to filter coarse material such as branches, leaves, gravel and the like so as to prevent clogging of the sewer network. The sewer baskets are removed and cleaned from time to time and make sewage more easy to filter at the filtration station to which the sewer network is connected. The baskets are usually supported within the vertical sewer pipe at about three feet below street level and are removably supported by devices that are difficult to install or which require modification of the surface of the sewer pipe. For instance angle irons can be permanently secured to the sewer surface by screws driven into the sewer wall or as described in U.S. Pat. No. 530,816 to Wright entitled "Manhole for sewers" and dated Dec. 11, 1894, a metal sleeve has to be inserted into the manhole with an inturned rim at its lower end on which the frame of the sewer basket is releasably supported. Another example of a support system for a sewer basket is found in U.S. Pat. No. 122,209 dated Dec. 26, 1871 entitled "Improvement in sewer traps and catch basins" to Ashman et al. In this patent the sewer wall is modified at the desired level to provide a ledge all around the sewer pipe on which the sewer basket releasably rests.

OBJECTS OF THE INVENTION

The general object of the present invention is to provide a sewer basket support that can be releasably secured to the sewer wall at any adjustable level and without in any way modifying the structure of the sewer wall.

Another object of the present invention is to provide a sewer basket support that can be shaped to fit sewers of various cross-sectional shapes.

Another object of the present invention is to provide a sewer basket of a simple, inexpensive and yet long-lasting construction.

Another object of the present invention is to provide a sewer basket support frame which can be easily fitted to the sewer wall at an adjustable level and using standard tools and within a minimum of time.

SUMMARY OF THE INVENTION

This invention comprises the combination of a removable sewer basket with a sewer basket support for retaining said basket at a selected level within a vertical sewer pipe having an interior surface and an opening at street level, said basket including a basket frame, a filter screen secured to and closing said basket frame, said basket support comprising an expandable support for extending entirely around said interior surface of said sewer pipe, said support having at least one pair of opposite spaced free ends, an adjustable expansion device joining said opposite ends to expand said support against said interior surface of said sewer pipe and to fix said support to said interior surface at the selected level below street level, said basket frame releasably resting on said support, and a handle device accessible at street level to position and place said basket on and to retrieve said basket from said basket support.

Preferably, there is a crossbar secured to opposite sections of said basket frame, said handle device including a post, a handle at the upper end of said post, the lower end of said post attached to the middle of said crossbar.

An upright sleeve is secured to the middle of said crossbar, the lower end of said post releasably fitted within and attached to said sleeve.

Alternately, an eye member is secured to the middle of said crossbar and further including a hook member formed at the lower end of said post and removably engaging said eye member.

The support consists of a frame forming strip, said opposite ends formed by the ends of said strip and consisting of inturned perforated ears and said expansion device includes a bolt extending through and joining said ears and nuts screwed on said bolts and engaging said ears to spread said ears apart and retain said ears in adjusted spaced apart position.

The support is circular and has only one pair of opposite ends.

Alternately, the support has a quadrilateral shape being made of two U-shape sections with two pairs of opposite ends. The crossbar may be straight or downwardly angled and overlies the filter screen.

Preferably, the support has inwardly directed ears on which said basket removably rests.

Alternately, the support is a telescopic, straight tube including an inner and an outer tube sections, transversely opposite perforated ears outwardly extending from and secured to said inner and outer tube sections respectively on each side thereof, there being an expansion device on each side of said tube, each device including a bolt extending through and joining a pair of ears and nuts screwed on said bolts on each side of said ears to spread said ears apart and retain said telescopic tube sections in telescopically adjusted position.

BRIEF DESCRIPTION OF THE DRAWINGS

In the annexed drawings, like reference characters indicate like elements throughout.

FIG. 3 is an end view of the support frame bolt and nuts system taken along line 3—3 of FIG. 2 to expand the same against the sewer wall and used for the embodiments of FIGS. 2 and 2a;

DETAILED DESCRIPTION OF THE PREFERRED EMBODIMENT

Figure 1:
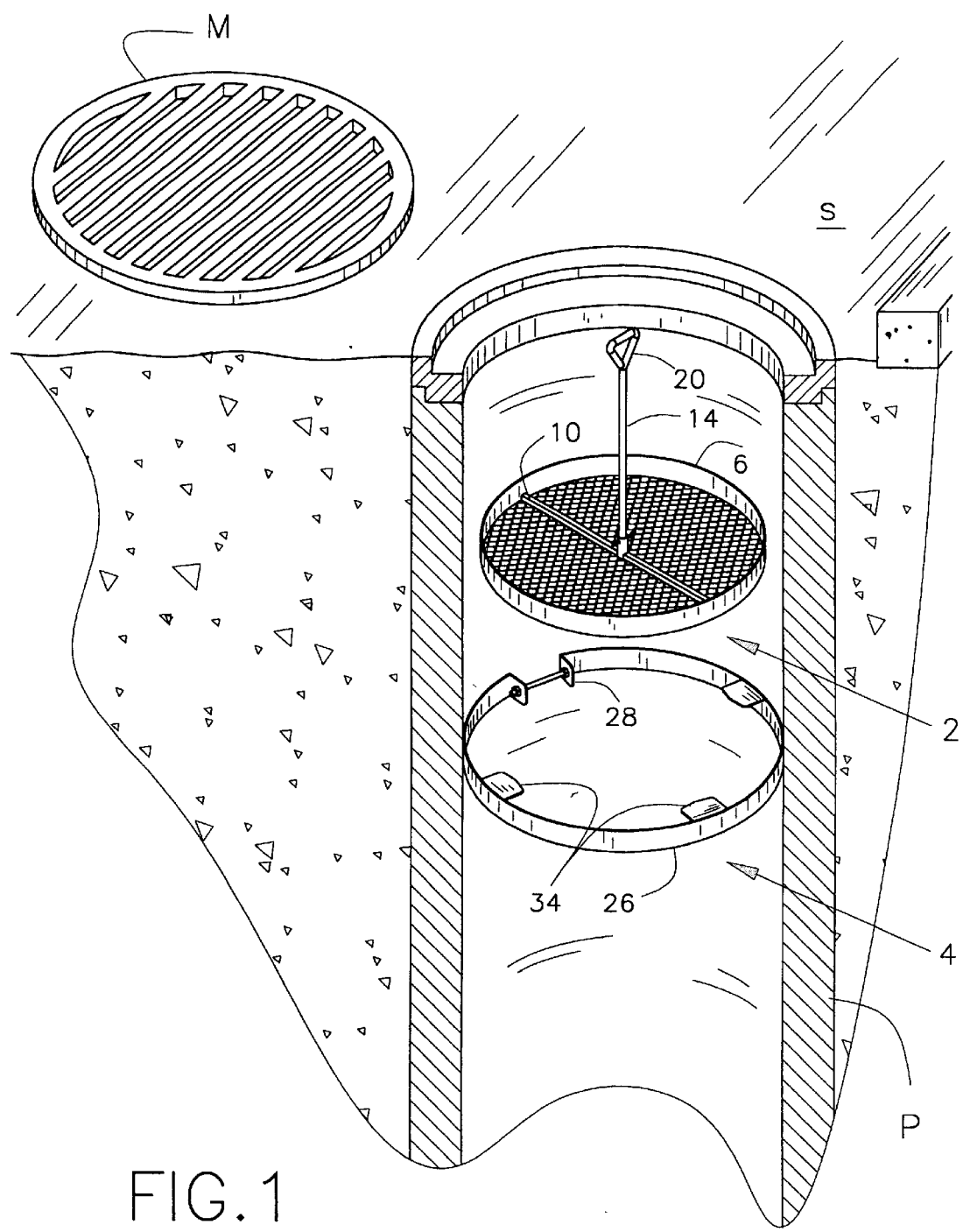
FIG. 1 is a perspective view partly in section of a street with a vertical sewer shown in longitudinal section inside which is shown an exploded perspective view of a first embodiment of the sewer basket of the invention together with the support frame for the same, the Figure also showing the normal grate or manhole cover to close the top of the sewer.
Figure 4:
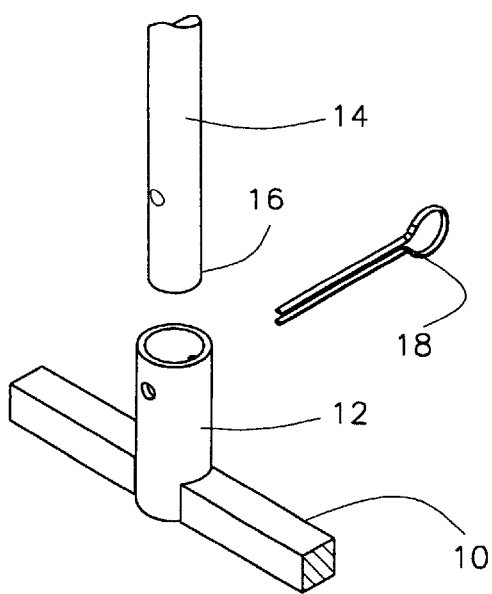
FIG. 4 is a partial perspective view showing one embodiment for connecting the crossbar of the sewer basket with a post having a handle at its upper end.
Figure 4A:
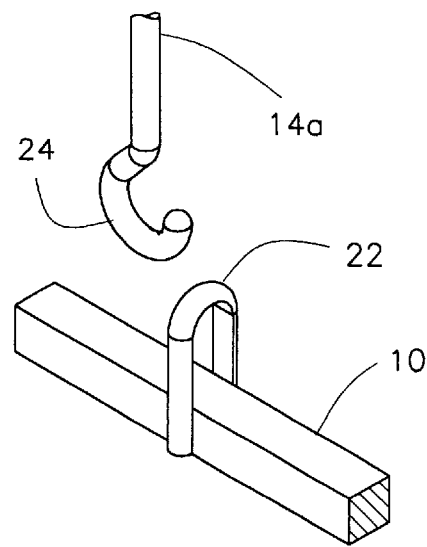
FIG. 4a shows another embodiment of the means for connecting the crossbar of the basket with the handle post.
Figure 5:
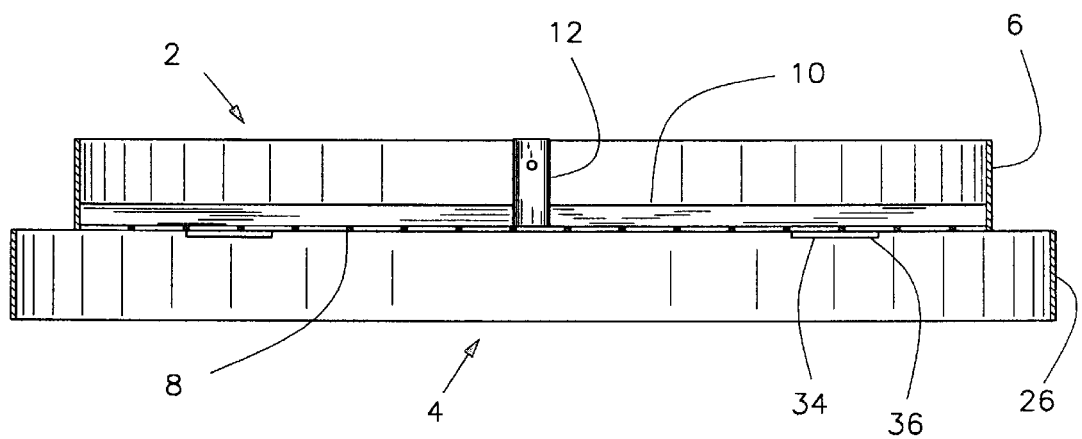
FIG. 5 is a section taken along line 5—5, of FIG. 2.
Figure 5A:
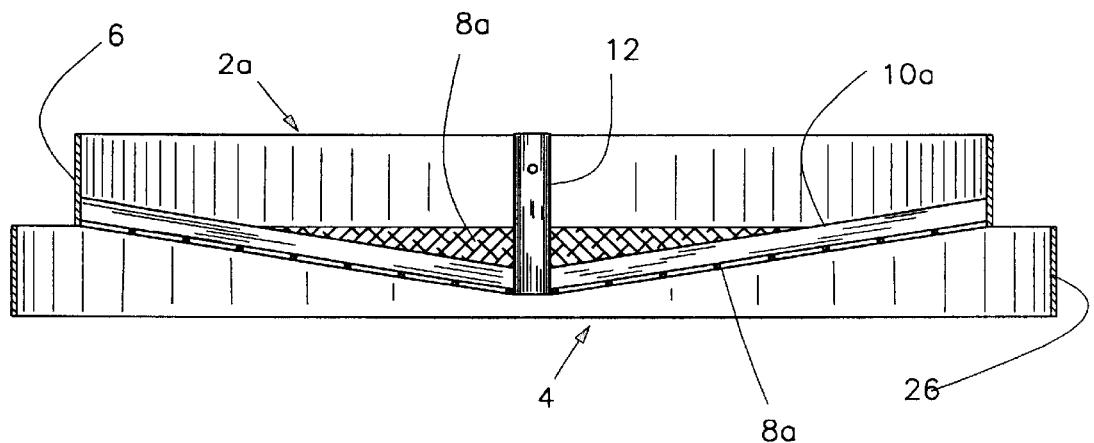
FIG. 5a is an elevation of the assembly of the invention, the basket being modified with respect to FIGS. 1 and 5.

Referring to FIG. 1, there is shown a basket 2 releasably supported on a basket support 4 within the upper part of a vertical sewer pipe P which opens at street level and has an interior surface, the street being indicated at S and normally closed by a manhole cover M. The basket 2 includes a basket frame 6 which is circular and formed of a cylindrical flat strip; a filter screen 8 closes the basket frame 6 being secured thereto all around the lower edge of the same. A straight crossbar 10 is secured to the basket frame 6 and extends across the same; the crossbar 10 overlies the filter screen 8 as shown in FIG. 5. The crossbar 10a may be angled at its center as shown at 10a for basket 2a in FIG. 5a. An upright sleeve 12 or 12a is secured to the center of the crossbar 10 or 10a, the sleeve terminating at approximately the top edge of the basket frame 6 or 6a as shown in FIGS. 5 and 5a respectively. A post or rod 14 has its lower end 16 fitted within sleeve 12 or 12a by means of a cotter pin 18 as shown in FIG. 4. As shown in FIG. 4a, sleeve 12 can be replaced by an eye 22 to be releasably engaged by a hook 24 formed at the lower end of post 14a. The top end of the post 14 is formed with a handle 20 which normally extends just underneath the manhole cover, for easy removal of the filled basket and for re-inserting the same in operative position within the sewer pipe P.

Basket support 4 is expandable for supporting the basket 2 at any selected level within the sewer pipe P and this without in any way modifying the interior surface of the sewer pipe. Basket support 4 includes a flat strip 26 that is bent into a circular shape with spaced opposite ends each formed by an inturned ear 28. The two ears 28 are perforated and a bolt 30 extends therethrough and spans the space between the ears 28. Two pairs of nuts 32 are screwed on bolt 30 on each side of the respective ears 28 so as to adjust the spacing between the ears 28 and lock the latter at the desired adjusted spacing. Therefore the basket support 4 can be first inserted within the sewer pipe P and then expanded by means of the bolt 30 and nuts 32 using standard tools. The support strip 26 is provided with a basket frame engaging ears 34 which are inwardly folded from top edge 36 of strip 26. The frame 6 of the basket 2 simply rests on the ears 34.

Figure 2:
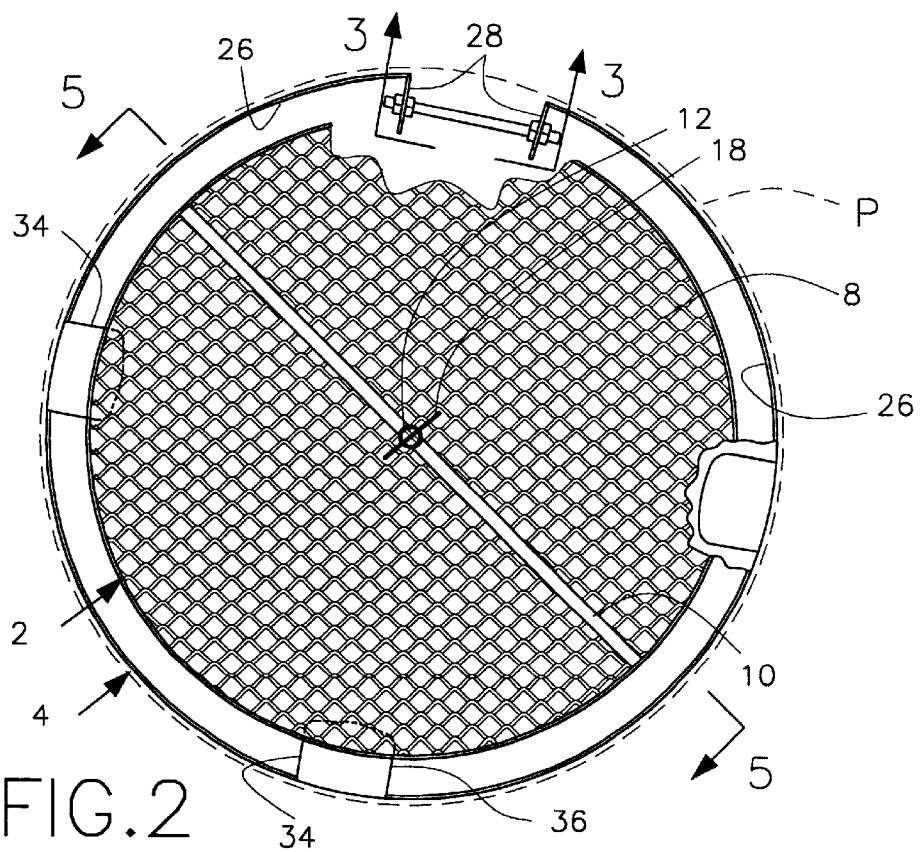
FIG. 2 is a top view of first embodiment of this basket and its support frame.
Figure 2A:
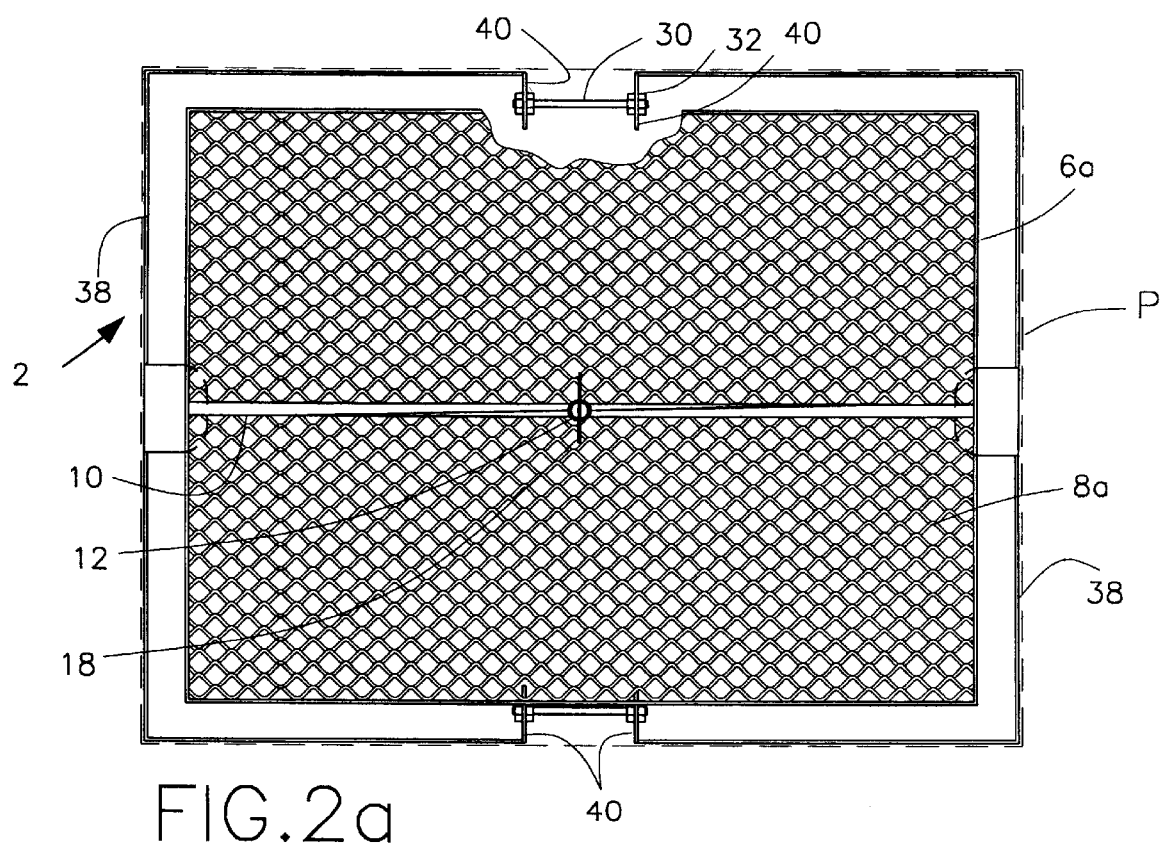
FIG. 2a is a top view of a second embodiment of the assembly of the sewer basket and of its support frame to fit a sewer wall of quadrangular shape.

If the sewer pipe P has a quadrilateral cross-section as is often found in sewer pipe manholes, then the basket and its basket support can be shaped to fit the cross-sectional shape of the sewer pipe, as shown in FIG. 2a. There is shown a basket frame 2a of rectangular cross-sectional shape, formed as in the previous embodiment of a rectangular flat strip frame 6a to the under side of which is secured a similarly shaped filter screen 8a which is overlied by crossbar 10. Here again a post 14 is provided with a handle 20 at its upper end and a lower end adapted to be connected to the center of the crossbar 10 as by the systems of the FIG. 4 or 4a.

The basket support 4a is formed of two U-shaped sections 38, the opposite spaced ends of which are defined by inturned ears 40; each pair of ears is connected by a bolt 30 with nuts 32 to adjust the spacing between each of the two pairs of ears and therefore to expand the basket support and force the same against the sewer pipe interior surface to form a strong support for the basket.

Figure 2B:
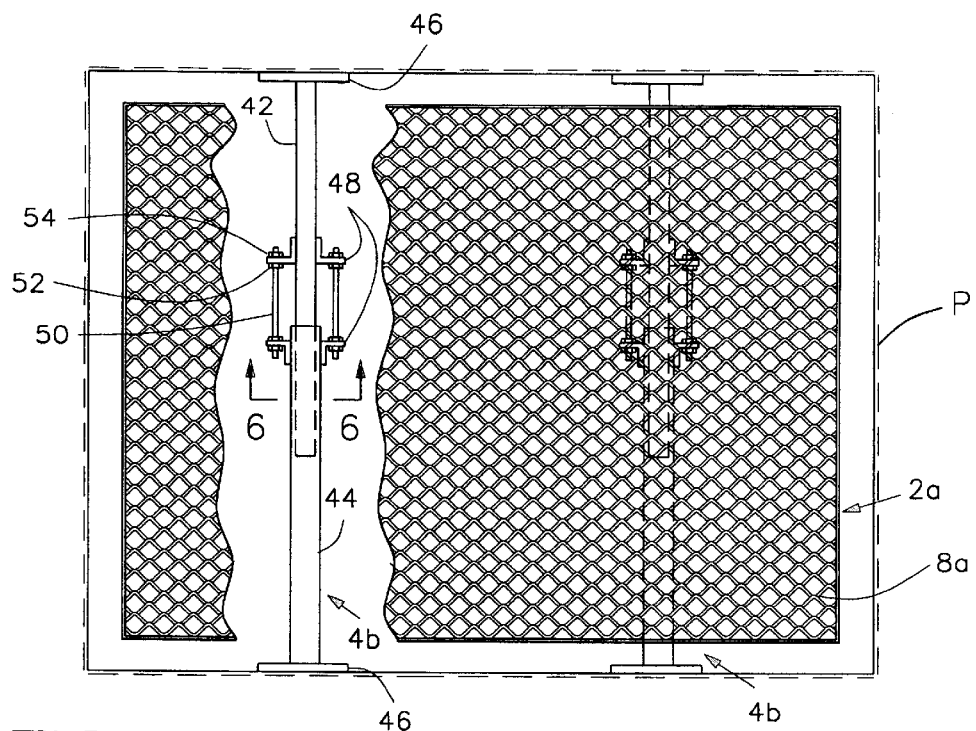
FIG. 2b is a top view of the basket of FIG. 2a but with another embodiment of the support frame.
Figure 3:
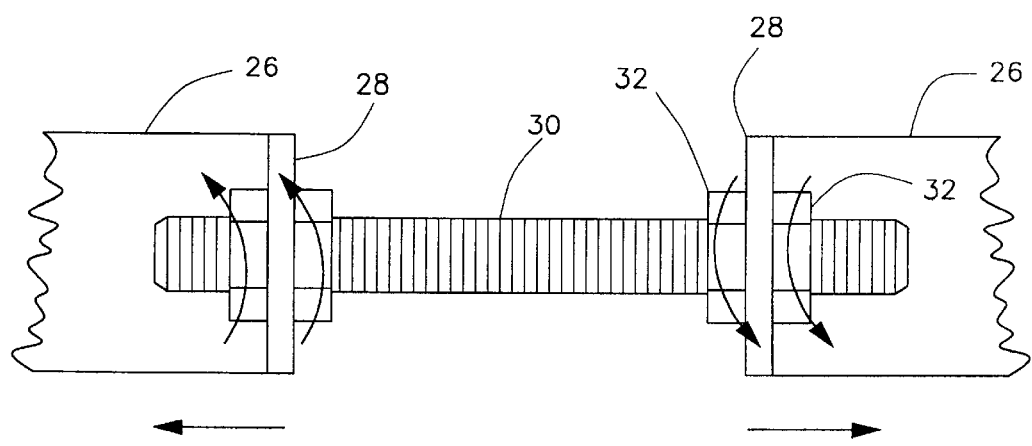
Figure 6:
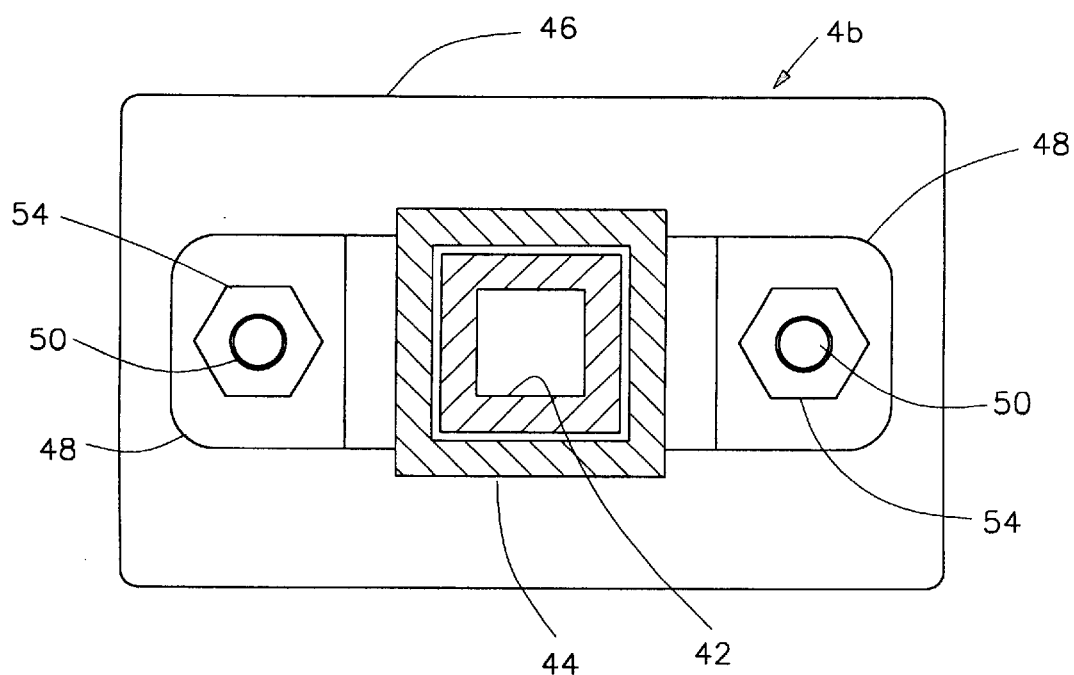
FIG. 6 is a cross-section taken along line 6—6 of FIG. 2b.

FIGS. 2b and 6 show another embodiment of the expandable basket support. This support 4b is shown to support basket 2a of FIG. 2a but could as well support the circular basket 2 of FIG. 2.

Support 4b is a telescopic tube made of an inner tube section 42 fitted within an outer tube section 44. The outer ends of sections 42, 44 carry sewer engaging pads 46. Four ears 48 having a right angle shape are secured in transversely opposite pairs to opposed sides of inner and outer tube sections 42, 44 respectively. The outwardly extending portions of ears 48 have a hole through which extends a bolt 50 on which are screwed two pairs of nuts 52, 54 the inner nuts 52 of each pair on each side of tube sections 42, 44 are screwed to push pads 46 against the sewer pipe walls and outer nuts 54 are then screwed to lock the tube section 42, 44 in adjusted position. Basket 2 or 2a is then simply deposited on support 4b.

Preferably, both the basket 2 and the basket support 4 are entirely either made out of rigid and highly resistant non-corrosive material or protected against corrosion from any suitable protective coating.

I claim:

1. The combination of a removable sewer basket with a sewer basket support for retaining said basket at a selected level within a vertical sewer pipe having an interior surface and an opening at street level, said basket including a basket frame, a filter screen secured to and closing said basket frame, said basket support comprising an expandable support for extending entirely around said interior surface of said sewer pipe, said support having at least one pair of opposite spaced free ends, an adjustable expansion device joining said opposite ends to expand said support against said interior surface of said sewer pipe and to fix said support to said interior surface at the selected level below street level, said basket frame releasably resting on said support, and a handle device accessible at street level to position and place said basket on and to retrieve said basket from said basket support.

2. The combination as defined in claim 1, further including a crossbar secured to opposite sections of said basket frame, said handle device including a post, a handle at the upper end of said post, the lower end of said post attached to the middle of said crossbar.

3. The combination as defined in claim 2, wherein an upright sleeve is secured to the middle of said crossbar, the lower end of said post releasably fitted within and attached to said sleeve.

4. The combination as defined in claim 2, wherein an eye member is secured to the middle of said crossbar and further including a hook member formed at the lower end of said post and removably engaging said eye member.

5. The combination as defined in claim 2, wherein said crossbar is straight and overlies said filter screen.

6. The combination as defined in claim 2, wherein said crossbar is angled at the center thereof, the central portions of said crossbar and of said filter screen being downwardly recessed relative to their outer portions.

7. The combination as defined in claim 1, wherein said support includes a frame forming strip, said opposite ends formed by the ends of said strip and including inturned perforated ears, and said expansion device includes a bolt extending through and joining said ears and nuts screwed onto said bolts and engaging said ears to spread said ears apart and retain said ears spaced apart from each other.

8. The combination as defined in claim 7, further including a crossbar secured to opposite portions of said basket frame, said handle device including a post, a handle at the upper end said post, the lower end said post attached to the middle of said crossbar.

9. The combination as defined in claim 8, wherein an upright sleeve is secured to the middle of said crossbar, the lower end of said post releasably fitted within and attached to said sleeve.

10. The combination as defined in claim 8, wherein an eye member is secured to the middle of said crossbar and further including a hook member formed at the lower end of said post and removably engaging said eye member.

11. The combination as defined in claim 7, wherein said support is circular and has one said pair of opposite ends.

12. The combination as defined in claim 11, wherein said crossbar is straight and overlies said filter screen.

13. The combination as defined in claim 11, wherein said crossbar is angled at the center thereof, the central portion of said crossbar and of said filter screen being downwardly recessed relative to their outer portions.

14. The combination as defined in claim 7, wherein said support has a quadrilateral shape being made of two U-shaped sections with two of said pair of opposite ends.

15. The combination as defined in claim 14, wherein said crossbar is straight and overlies said filter screen.

16. The combination as defined in claim 14, wherein said cross bar is angled at the center thereof and overlies said filter screen, the central portion of said cross bar and of said filter screen being downwardly recessed relative to the their outer portions.

17. The combination as defined in claim 1, wherein said support is circular and has one said pair of opposite ends.

18. The combination as defined in claim 1, wherein said support has a quadrilateral shape being made of two U-shaped sections with two of said pair of opposite ends.

19. The combination as defined in claim 1, wherein said support has inwardly directed ears on which said basket removably rests.

* * * * *